US008632881B2

(12) United States Patent
Mizusaki et al.

(10) Patent No.: US 8,632,881 B2
(45) Date of Patent: *Jan. 21, 2014

(54) GLASS FIBER PRODUCT

(75) Inventors: Toru Mizusaki, Echizen (JP); Shuichiro Shinohara, Echizen (JP)

(73) Assignee: Nissin Chemical Industry Co., Ltd., Echizen-shi (JP)

( * ) Notice: Subject to any disclaimer, the term of this patent is extended or adjusted under 35 U.S.C. 154(b) by 970 days.

This patent is subject to a terminal disclaimer.

(21) Appl. No.: 12/361,071

(22) Filed: Jan. 28, 2009

(65) Prior Publication Data

US 2009/0136764 A1 May 28, 2009

Related U.S. Application Data

(63) Continuation-in-part of application No. 11/896,850, filed on Sep. 6, 2007, now abandoned.

(30) Foreign Application Priority Data

Sep. 8, 2006 (JP) ................................. 2006-243773

(51) Int. Cl.
 *B32B 9/00* (2006.01)
 *C08F 283/00* (2006.01)
(52) U.S. Cl.
 USPC ........... 428/392; 428/375; 428/378; 428/391; 525/487; 525/474; 523/273
(58) Field of Classification Search
 None
 See application file for complete search history.

(56) References Cited

U.S. PATENT DOCUMENTS

| | | | |
|---|---|---|---|
| 3,444,114 A | 5/1969 | Downing | |
| 3,464,946 A | 9/1969 | Downing | |
| 5,075,370 A | 12/1991 | Kubitza et al. | |
| 6,734,228 B1 * | 5/2004 | Sakuma et al. | 523/211 |
| 6,861,466 B2 * | 3/2005 | Dadalas et al. | 524/544 |
| 7,473,440 B2 * | 1/2009 | Kajander | 427/379 |
| 7,872,064 B2 * | 1/2011 | Mizusaki et al. | 524/377 |
| 8,216,673 B2 * | 7/2012 | Mizusaki et al. | 428/391 |
| 2003/0078307 A1 | 4/2003 | Shinohara et al. | |
| 2003/0129903 A1 * | 7/2003 | Moes | 442/180 |
| 2005/0277711 A1 | 12/2005 | Takahata et al. | |
| 2008/0063852 A1 * | 3/2008 | Mizusaki et al. | 428/220 |

FOREIGN PATENT DOCUMENTS

| | | |
|---|---|---|
| JP | 5-140491 A | 6/1993 |
| JP | 7-315888 A | 12/1995 |
| JP | 8-32851 A | 2/1996 |
| JP | 2000-104015 A | 4/2000 |
| JP | 2003-253599 A | 9/2003 |
| JP | 2004-066047 A | 3/2004 |
| JP | 2005-146159 A | 6/2005 |
| JP | 2005-154912 A | 6/2005 |

OTHER PUBLICATIONS

JP 2005-154912, Yamada, machine translation, Jun. 2005.*
JP 2004-066047, Nakamura, machine translation, Mar. 2004.*
ICI Americas Inc., "The HLB System a time-saving guide to emulsifier selection"; Mar. 1980; pp. 1-22.*
Machine translation of JP-2003-253599-A, Sep. 2003.
Machine translation of JP-2004-066047-A, Mar. 2004.
Machine translation of JP-2005-154912-A, Jun. 2005.

* cited by examiner

*Primary Examiner* — Jill Gray
(74) *Attorney, Agent, or Firm* — Birch, Stewart, Kolasch & Birch, LLP

(57) ABSTRACT

A glass fiber product comprises glass fibers treated with a coating composition comprising a synthetic resin and a mixture of an acetylene glycol or an ethylene oxide-propylene oxide block or random adduct thereof and a polyoxyalkylene alkyl ether having an HLB of 8 to 18 or a sulfur-containing surfactant.

13 Claims, No Drawings

GLASS FIBER PRODUCT

CROSS REFERENCE TO RELATED APPLICATION

This application is a continuation-in-part of application Ser. No. 11/896,850 filed on Sep. 6, 2007 now abandoned, the entire contents of which are hereby incorporated by reference.

TECHNICAL FIELD

This invention relates to a glass fiber product having a protective coating containing an acetylene compound thereon, and more specifically, to a glass fiber product having a protective coating thereon which exhibits excellent adhesion and water resistance.

BACKGROUND ART

A protective coating is required to have various different properties depending on the intended application of the layer. For example, a protective coating used as a building material or building exterior material is required to exhibit good adhesion and corrosion resistance, and in some cases, a high heat resistance and capability of adhering to other substrates.

The building material industry is currently experiencing switchover from protective materials using an organic solvent to those using water in view of reducing the use of volatile organic compounds (VOC).

A protective coating formed by using a water-borne resin, however, had the problem of inferior initial water resistance compared to the protective material prepared by using an organic solvent. Accordingly, such protective coating often suffered from peeling and other problems when the protective coating experienced a high humidity condition, for example, a rainfall immediately after the coating. In view of such situation, an attempt has recently made to improve the water resistance of the water-borne protective coating by reacting acidic functional group of the anionic water-borne resin with an oxylane group-containing compound to thereby leave no hydrophilic group. This protective coating was still insufficient in its initial water resistance immediately after the coating.

U.S. Pat. No. 3,464,946 and U.S. Pat. No. 3,444,114 disclose an alkyl etherified amino resin which has been converted by reaction with an oxycarboxylic acid to enable its use in water-borne composition. These attempts, however, failed to solve the problem of the water resistance.

JP-B 8-32851 discloses a two part-type water-borne coating composition which is cured with isocyanate. This composition is still insufficient in the water resistance.

Accordingly, there is a need for development of a protective coating which exhibits improved properties such as water resistance and adhesion.

Lead salt pigments such as minimum, lead cyanamide, and calcium metaplumbate, and metal chromate pigments such as basic zinc chromate and strontium chromate had once been the main reagent used for coating composition of an automobile. Use of such reagent, however, was gradually restricted in consideration of the health hazard and environmental conservation. Since then, non-polluting, non-toxic rust preventive pigments have been developed. Exemplary such rust preventive pigments include metal phosphates such as zinc phosphate, calcium magnesium phosphate, titanium phosphate, and silica phosphate; condensed metal phosphates such as aluminum tripolyphosphate; metal phosphorite such as zinc phosphorite, calcium phosphorite, strontium phosphorite, and aluminum phosphorite; zinc molybdate, calcium molybdate, barium borate, and zinc borate. These non-polluting, non-toxic pigments, however, failed to exhibit performance comparable to that of the lead salt pigments and chromate pigments.

JP-A 5-140491 discloses a water-borne etch-resistant coating composition for a metal plate produced by adding a surfactant and an acetylene alcohol compound and/or an acetylene glycol compound. In this coating composition, the uniform distribution of the resin component on the metal surface is enabled by the use of the surfactant and the acetylene alcohol compound and/or the acetylene glycol compound, and it is the resin that realizes the etch-resistance.

JP-A 2000-104015 discloses a thermosetting coating composition comprising a water-borne polyurethane resin having the thermosetting property. Use of the urethane resin, however, is associated with the drawback of insufficient light resistance and high cost.

Especially, excellent glass fibers products are strongly required.

SUMMARY OF THE INVENTION

An object of the present invention is to provide a glass fiber product having excellent gathering property, high strength and deterioration resistance.

The inventors of the present invention made an intensive study to realize the objects as described above, and found that the protective coating prepared by blending the synthetic resin as described below which constitutes the base of the coating composition with a mixture of an acetylene glycol surfactant, a polyoxyalkylene alkyl ether having an HLB (Hydrophilic-Lipophilic Balance) of a particular range, and a sulfur-containing surfactant exhibits an excellent adhesion to glass fibers and protective performance including water resistance, and such protective coating capable of solving the prior art problems as described above are particularly useful as a protective coating for use in the glass fiber products.

More specifically, glass fiber products such as glass cloths, chopped strand mats and robing cloths are treated with the coating composition containing acetylene glycol. When the coating composition is used for strand manufacture, the coating composition has a high penetration to glass filaments and fully and strongly adheres to the filaments. Thus, hairiness of the filaments is little caused. Since the thus treated filaments have a good gathering property, the strength is improved when a mat is formed. When the coating composition is used for chopped strand mat manufacture, the surface of the strand including the points of intersection is evenly coated with the coating composition.

The coating composition of the present invention can impart good penetration and levelling property to glass fibers or glass fiber products, can improve a strength of glass fibers at their surfaces, and can give an excellent deterioration resistance by protecting glass fibers or glass fiber products from the outer environment.

Accordingly, the present invention provides a glass fiber product comprising glass fibers having a protective coating thereon, the protective coating being formed from a coating composition comprising 100 parts by weight of a synthetic resin solid content (A); and 0.01 to 10 parts by weight of a mixture of (B-1) 10 to 90% by weight of at least one member selected from an acetylene glycol represented by the following general formula (1):

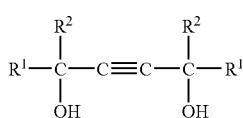

(1)

wherein $R^1$ and $R^2$ are respectively an alkyl group containing 1 to 5 carbon atoms,
an ethylene oxide-propylene oxide block adduct of an acetylene glycol represented by the following general formula (2):

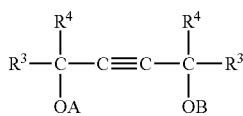

(2)

wherein $R^3$ and $R^4$ are respectively an alkyl group containing 1 to 5 carbon atoms; A is $-(C_2H_4O)_{w1}-(C_3H_6O)_{x1}-(C_2H_4O)_{y1}-(C_3H_6O)_{z1}-H$; and B is $-(C_2H_4O)_{w2}-(C_3H_6O)_{x2}-(C_2H_4O)_{y2}-(C_3H_6O)_{z2}-H$; wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100); and
an ethylene oxide-propylene oxide random adduct of an acetylene glycol represented by the following general formula (3):

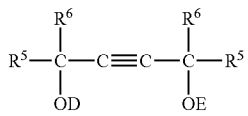

(3)

wherein $R^5$ and $R^6$ are respectively an alkyl group containing 1 to 5 carbon atoms; D is $-(C_2H_4O/C_3H_6O)_m-H$; and E is $-(C_2H_4O/C_3H_6O)_n-H$; wherein m and n are respectively 0 or a positive number of 0.5 to 50, and m+n is 1 to 100);
(B-2) 10 to 90% by weight of at least one member selected from
a polyoxyalkylene alkyl ether having an HLB of 8 to 18 represented by the following general formula (4):

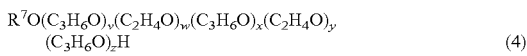

$R^7O(C_3H_6O)_v(C_2H_4O)_w(C_3H_6O)_x(C_2H_4O)_y(C_3H_6O)_zH$ (4)

wherein $R^7$ is an alkyl group containing 1 to 20 carbon atoms; v, w, x, y, and z are respectively 0 or a positive number of 1 to 20; with the proviso v+w+x+y+z>0; and
sulfur-containing surfactants represented by the following general formula (5):

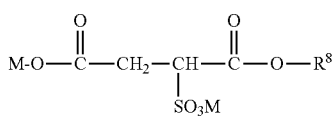

(5)

or general formula (6):

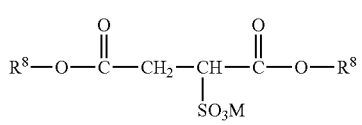

(6)

wherein M independently represents an alkali metal or ammonium group, $R^8$ independently represents hydrogen atom or an alkyl group containing 1 to 20 carbon atoms; and
(B-3) 0 to 25% by weight of water and/or a water soluble organic solvent.

In this case, it is preferable that the component (A) is at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin.

Moreover, it is also preferable that the component (B-1) has a sodium content of up to 1,000 ppm and the protective coating layer has a thickness of 0.001 to 5 µm.

DESCRIPTION OF THE PREFERRED EMBODIMENTS

The protective coating containing an acetylene compound of the present invention for treating glass fibers or glass fiber products comprises
100 parts by weight of a synthetic resin solid content (A); and
0.01 to 10 parts by weight of a mixture of
(B-1) 10 to 90% by weight of at least one member selected from
an acetylene glycol represented by the following general formula (1):

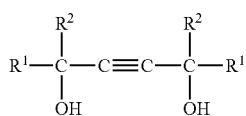

(1)

wherein $R^1$ and $R^2$ are respectively an alkyl group containing 1 to 5 carbon atoms,
an ethylene oxide-propylene oxide block adduct of an acetylene glycol represented by the following general formula (2):

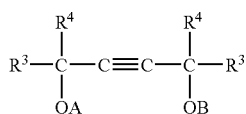

(2)

wherein $R^3$ and $R^4$ are respectively an alkyl group containing 1 to 5 carbon atoms; A is $-(C_2H_4O)_{w1}-(C_3H_6O)_{x1}-(C_2H_4O)_{y1}-(C_3H_6O)_{z1}-H$; and B is $-(C_2H_4O)_{w2}-(C_3H_6O)_{x2}-(C_2H_4O)_{y1}-(C_3H_6O)_{z2}-H$; wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100); and an ethylene oxide-propylene oxide random adduct of an acetylene glycol represented by the following general formula (3):

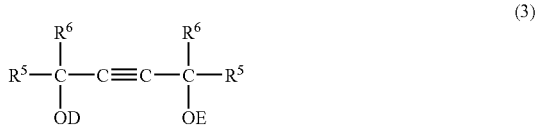

(3)

wherein $R^5$ and $R^6$ are respectively an alkyl group containing 1 to 5 carbon atoms; D is $—(C_2H_4O/C_3H_6O)_m—$H; and E is $—(C_2H_4O/C_3H_6O)_n—$H; wherein m and n are respectively 0 or a positive number of 0.5 to 50, and m+n is 1 to 100);

(B-2) 10 to 90% by weight of at least one member selected from
a polyoxyalkylene alkyl ether having an HLB of 8 to 18 represented by the following general formula (4):

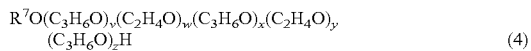

$R^7O(C_3H_6O)_v(C_2H_4O)_w(C_3H_6O)_x(C_2H_4O)_y(C_3H_6O)_zH$ (4)

wherein $R^7$ is an alkyl group containing 1 to 20 carbon atoms; v, w, x, y, and z are respectively 0 or a positive number of 1 to 20; with the proviso v+w+x+y+z>0; and sulfur-containing surfactants represented by the following general formula (5):

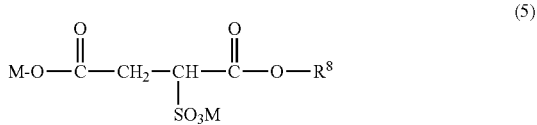

(5)

or general formula (6):

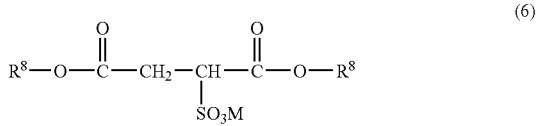

(6)

wherein M independently represents an alkali metal or ammonium group, $R^8$ independently represents hydrogen atom or an alkyl group containing 1 to 20 carbon atoms; and (B-3) 0 to 25% by weight of water and/or a water soluble organic solvent.

The main component constituting the coating composition for forming the protective coating of the present invention is the component (A), and this component (A) is preferably at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and water soluble epoxy resin. Among these, the preferred in view of versatility and cost are (meth)acrylate resin emulsion, styrene-acrylate copolymer emulsion, vinyl acetate resin emulsion, and vinyl acetate-(meth)acrylate copolymer emulsion. The resin may be either the one produced by emulsion polymerization using a known polymerization method or a commercially available product. The emulsion used for the component (A) preferably has a solid content of 20 to 60% by weight, and more preferably, a solid content of 30 to 50% by weight.

The monomer containing an unsaturated group used for the component (A), and in particular, (meth)acrylate resin emulsion, styrene/acrylate copolymer emulsion, vinyl acetate resin emulsion, and vinyl acetate/(meth)acrylate copolymer emulsion is not particularly limited, and exemplary monomers include ethylene, propylene; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylate esters such as methyl acrylate, ethyl acrylate, butyl acrylate, 2-ethylhexyl acrylate, and methyl methacrylate; ethylenically unsaturated dicarboxylate esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid, and fumaric acid; epoxy group-containing monomers such as glycidyl methacrylate; alcohol group-containing monomers such as 2-hydroxyethyl methacrylate; alkoxyl group-containing monomers such as methoxyethyl acrylate; nitrile group-containing monomers such as acrylonitrile; amide group-containing monomer such as acrylamide; amino group-containing monomer such as dimethylaminoethyl methacrylate; and a monomer containing two or more ethylenically unsaturated groups such as divinylbenzene and allylmethacrylate. The emulsion polymerization may be conducted by using such monomers.

The emulsion polymerization may be accomplished by any emulsion polymerization method known in the art. The unsaturated group-containing monomer and other polymerization aids (such as an emulsifying agent such as alkyl sulfate ester salt, a polymerization initiator such as ammonium sulfate, a pH adjusting agent such as sodium carbonate, and various antifoaming agents) may be added at once at the initial stage of the reaction; continuously in the course of the reaction; or intermittently or in divided dose during the polymerization.

The emulsifying agent used in such emulsion polymerization include the surfactants as described in the following (1) to (4), and such surfactant may be used either alone or in combination of two or more.

(1) Anionic Surfactant
Surfactants such as alkyl sulfate ester salt, polyoxyethylene alkyl ether sulfate ester salt, alkyl benzene sulfonate, alkyl diphenyl ether disulfonate, alkyl naphthalene sulfonate, fatty acid salt, dialkyl sulfosuccinates salt, alkyl phosphate ester salt, and polyoxyethylene alkylphenyl phosphate ester salt.

(2) Nonionic Surfactant
Surfactant such as polyoxyethylene alkylphenyl ether, polyoxyethylene alkyl ether, polyoxyethylene fatty ester, sorbitan fatty acid ester, polyoxyethylene sorbitan fatty acid ester, polyoxyalkylene alkyl ether, polyoxyethylene derivative, glycerin fatty acid ester, polyoxyethylene hydrogenated castor oil, polyoxyethylene alkylamine, alkyl alkanol amide, or acetylene alcohol, acetylene glycol, and their ethylene oxide adduct.

(3) Cationic Surfactant
Surfactant such as alkyltrimethyl ammonium chloride, dialkyl dimethyl ammonium chloride, alkyl benzyl ammonium chloride, and alkylamine salt.

(4) Polymerizable surfactant having radically polymerizable double bond in its molecule, for example, alkylallyl sulfosuccinate salt, methacryloyl polyoxyalkylene sulfate salt, and polyoxyethylene nonylpropenylphenyl ether sulfate salt.

Such surfactant may be used at an amount of 0.3 to 20 parts by weight, and preferably at 0.5 to 10 parts by weight in relation to the unsaturated group-containing monomer.

The polymerization initiator used in such emulsion polymerization include persulfates such as ammonium persulfate and potassium persulfate; azo compounds such as 2,2'-diamidino-2,2'-azopropane dihydrochloride and azobisisobutyronitrile; and peroxides such as cumene hydroperoxide, benzoyl peroxide, and hydrogen peroxide. The polymerization initiator used may also be a known redox initiator, for example, potassium persulfuric and sodium hydrogen sulfite. Such polymerization initiator may be used at an amount of 0.1 to 5 parts by weight, and preferably at 0.2 to 2 parts by weight in relation to the unsaturated group-containing monomer.

The temperature used for the emulsion polymerization is generally 10 to 90° C., and preferably 50 to 80° C. The time used for the polymerization is 3 to 20 hours. The polymerization is preferably conducted in an inert atmosphere such as nitrogen gas.

Of the mixture incorporated in the coating composition for forming the protective coating of the present invention, the component (B-1) is at least one acetylene glycol or its adduct selected from the acetylene glycols represented by the general formula (1) and alkylene oxide adducts of the acetylene glycol represented by the general formula (2) and (3).

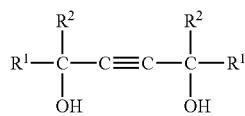

(1)

In the formula, $R^1$ and $R^2$ are respectively an alkyl group containing 1 to 5 carbon atoms.

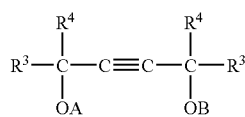

(2)

In the formula, $R^3$ and $R^4$ are respectively an alkyl group containing 1 to 5 carbon atoms; A is $-(C_2H_4O)_{w1}-(C_3H_6O)_{x1}-(C_2H_4O)_{y1}-(C_3H_6O)_{z1}-H$; and B is $-(C_2H_4O)_{w2}-(C_3H_6O)_{x2}-(C_2H_4O)_{y2}-(C_3H_6O)_{z2}-H$, wherein w1, w2, x1, x2, y1, y2, z1, and z2 are respectively 0 or a positive number of 0.5 to 25; w1+w2+y1+y2 is 0.5 to 50, preferably 2.5 to 42.5, and more preferably 5 to 42.5; x1+x2+z1+z2 is 0.5 to 50, preferably 2.5 to 42.5, and more preferably 2.5 to 42.5; and w1+w2+x1+x2+y1+y2+z1+z2 is 1 to 100, preferably 5 to 85, and more preferably 10 to 85.

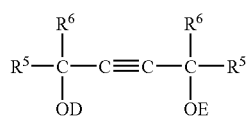

(3)

In the formula, $R^5$ and $R^6$ are respectively an alkyl group containing 1 to 5 carbon atoms; D is $-(C_2H_4O/C_3H_6O)_m-H$; and E is $-(C_2H_4O/C_3H_6O)_n-H$, wherein m and n are respectively 0 or a positive number of 0.5 to 50, and preferably 2.5 to 42.5, and m+n is 1 to 100, and preferably 5 to 85.

Exemplary acetylene glycols represented by the general formula (1) include
2,5,8,11-tetramethyl-6-dodecyne-5,8-diol,
5,8-dimethyl-6-dodecyne-5,8-diol,
2,4,7,9-tetramethyl-5-decyne-4,7-diol,
4,7-dimethyl-5-decyne-4,7-diol,
2,3,6,7-tetramethyl-4-octyne-3,6-diol,
3,6-dimethyl-4-octyne-3,6-diol, and
2,5-dimethyl-3-hexyne-2,5-diol.

Examples of the ethylene oxide-propylene oxide block adduct of the acetylene glycol represented by the general formula (2) include:
alkylene oxide adduct of 2,5,6,11-tetramethyl-6-dodecyne-5,8-diol (molar number of the ethylene oxide added: 10, molar number of the propylene oxide added: 40, w1=2 moles, w2=2 moles, x1=8 moles, x2=8 moles, y1=3 moles, y2=3 moles, z1=12 moles, z2=12 moles),
alkylene oxide adduct of 2,5,8,11-tetramethyl-6-dodecyne-5,8-diol (molar number of the ethylene oxide added: 40, molar number of the propylene oxide added: 10, w1=20 moles, w2=20 moles, x1=5 moles, x2=5 moles, y1, y2, z1, z2=0 mole),
alkylene oxide adduct of 5,8-dimethyl-6-dodecyne-5,8-diol (molar number of the ethylene oxide added: 20, molar number of the propylene oxide added: 20, w1=7 moles, w2=7 moles, x1=10 moles, x2=10 moles, y1=3 moles, y2=3 moles, z1, z2=0 mole),
alkylene oxide adduct of 5,8-dimethyl-6-dodecyne-5,8-diol (molar number of the ethylene oxide added: 20, molar number of the propylene oxide added: 20, w1, w2=0 mole, x1=10 moles, x2=10 moles, y1=10 moles, y2=10 moles, z1, z2=0 mole),
alkylene oxide adduct of 2,4,7,9-tetramethyl-5-decyne-4,7-diol (molar number of the ethylene oxide added: 20, molar number of the propylene oxide added: 10, w1=3 moles, w2=3 moles, x1=1 mole, x2=1 mole, y1=7 moles, y2=7 moles, z1=4 moles, z2=4 moles),
alkylene oxide adduct of 2,4,7,9-tetramethyl-5-decyne-4,7-diol (molar number of the ethylene oxide added: 20, molar number of the propylene oxide added: 10, w1=10 moles, w2=10 moles, x1=5 moles, x2=5 moles, y1, y2, z1, z2=0 mole),
alkylene oxide adduct of 4,7-dimethyl-5-decyne-4,7-diol (molar number of the ethylene oxide added: 30, molar number of the propylene oxide added: 6, w1=7 moles, w2=7 moles, x1=3 moles, x2=3 moles, y1=8 moles, y2=8 moles, z1, z2=0 mole),
alkylene oxide adduct of 4,7-dimethyl-5-decyne-4,7-diol (molar number of the ethylene oxide added: 30, molar number of the propylene oxide added: 6, w1, w2=0 mole, x1=1 mole, x2=1 mole, y=15 moles, y2=15 moles, z1=2 moles, z2=2 moles),
alkylene oxide adduct of 2,3,6,7-tetramethyl-4-octyne-3,6-diol (molar number of the ethylene oxide added: 8, molar number of the propylene oxide added: 4, w1=2 moles, w2=2 moles, x1=1 mole, x2=1 mole, y1=2 moles, y2=2 moles, z1=1 mole, z2=1 mole),
alkylene oxide adduct of 3,6-diethyl-4-octyne-3,6-diol (molar number of the ethylene oxide added: 24, molar number of the propylene oxide added: 18, w1=5 moles, w2=5 moles, x1=9 moles, x2=9 moles, y1=7 moles, y2=7 moles, z1, z2=0 mole),
alkylene oxide adduct of 3,6-dimethyl-4-octyne-3,6-diol (molar number of the ethylene oxide added: 36, molar number of the propylene oxide added: 26, w1=10 moles, w2=10 moles, x1=5 moles, x2=5 moles, y1=8 moles, y2=8 moles, z1=8 moles, z2=8 moles), and alkylene oxide adduct of 2,5-dimethyl-3-hexyne-2,5-diol (molar number of the ethylene oxide added: 44, molar number of the propylene oxide added: 40, w1=8 moles, w2=8 moles, x1=4 moles, x2=4 moles, y1=14 moles, y2=14 moles, z1=16 moles, z2=16 moles)

Examples of the ethylene oxide-propylene oxide random adduct of the acetylene glycol represented by the general formula (3) include:

alkylene oxide adduct of 2,5,8,11-tetramethyl-6-dodecyne-5,8-diol (molar number of the ethylene oxide added: 20, molar number of the propylene oxide added: 20, m=20 moles, n=20 moles), alkylene oxide adduct of 5,8-dimethyl-6-dodecyne-5,8-diol (molar number of the ethylene oxide added: 10, molar number of the propylene oxide added: 10, m=12 moles, n=8 moles), alkylene oxide adduct of 2,4,7,9-tetramethyl-5-decyne-4,7-diol (molar number of the ethylene oxide added: 15, molar number of the propylene oxide added: 15, m=13 moles, n=17 moles), alkylene oxide adduct of 4,7-dimethyl-5-decyne-4,7-diol (molar number of the ethylene oxide added: 27, molar number of the propylene oxide added: 27, m=27 moles, n=27 moles), alkylene oxide adduct of 2,3,6,7-tetramethyl-4-octyne-3,6-diol (molar number of the ethylene oxide added: 2.5, molar number of the propylene oxide added: 2.5, m=2.5 moles, n=2.5 moles), alkylene oxide adduct of 3,6-diethyl-4-octyne-3,6-diol (molar number of the ethylene oxide added: 21, molar number of the propylene oxide added: 21, m=20 moles, n=22 moles), alkylene oxide adduct of 3,6-dimethyl-4-octyne-3,6-diol (molar number of the ethylene oxide added: 31, molar number of the propylene oxide added: 31, m=27 moles, n=35 moles), and alkylene oxide adduct of 2,5-dimethyl-3-hexyne-2,5-diol (molar number of the ethylene oxide added: 42, molar number of the propylene oxide added: 42, m=42 moles, n=42 moles)

Total molar number of the alkylene oxide added in the general formulae (2) and (3) is 1 to 100 moles, preferably 5 to 85 moles, and more preferably 10 to 85 moles. When the molar number of the alkylene oxide unit added exceeds 100 moles, the compound will have an increased hydrophilicity which results in the decrease of affinity with the metal. This invites loss of adhesion and water resistance.

Total molar number of the ethylene oxide added in the general formulae (2) and (3) is preferably 0.5 to 50 moles, and more preferably 10 to 40 moles, and the molar number of the propylene oxide added is preferably 0.5 to 50 moles, and more preferably 10 to 40 moles. When the total molar number of the ethylene oxide added exceeds 50 moles, bubbling may occur to invite increase in the number of pin holes in the resulting coating. The total molar number of less than 0.5 moles may invite loss of miscibility in the preparation of the coating composition. In the meanwhile, when molar number of the propylene oxide added exceeds 50 moles, solubility will be reduced and this may invite aggregation of the composition. The total molar number of less than 0.5 moles may invite loss of miscibility in the preparation of the coating composition.

The component (B-1) may preferably have a sodium content of up to 1,000 ppm (0 to 1,000 ppm), and in addition, a potassium content of up to 2,000 ppm (0 to 2,000 ppm). More preferably, the component (B-1) may have a sodium content of 100 to 800 ppm. Use of the component (B-1) with the sodium content less than such amount will prevent loss of rust preventive properties and water resistance. The sodium content and the potassium content may be controlled to such range, for example, by purification of the acetylene glycol, use of highly purified starting materials, and synthesis of the acetylene glycol in a production environment that will prevent contamination of the metal.

The component (B-1) included the mixture has a hydrophobic group in its structure, and the composition is less likely to entrain water, and accordingly, the coating exhibits excellent water resistance.

The acetylene glycol or its adduct [component (B-1)] as described above may be used alone or in combination of two or more, and in preparing the protective coating of the present invention, the component (B-1) may be used at an amount of 10 to 90% by weight, and preferably at 20 to 80% by weight in relation to the total of the components (B-1) and (B-2) and the component (B-3) as described below. When this amount exceeds 90% by weight, solubility in water may become insufficient when used in preparing an aqueous coating composition, and when used at an amount of less than 10% by weight, bubbling may occur in the formation of the protective coating and this may invite defects such as increase in the number of pin holes formed in the resulting layer.

In the meanwhile, the component (B-2) is at least one member selected from a polyoxyalkylene alkyl ether having an HLB of 8 to 18 represented by the following general formula (4):

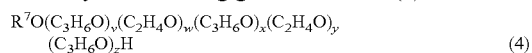

$$R^7O(C_3H_6O)_v(C_2H_4O)_w(C_3H_6O)_x(C_2H_4O)_y(C_3H_6O)_zH \quad (4)$$

wherein $R^7$ is an alkyl group containing 1 to 20 carbon atoms; v, w, x, y, and z are respectively 0 or a positive number of 1 to 20; with the proviso that (v+w+x+y+z) is a positive number of greater 0 and preferably 1 to 80; and sulfur-containing surfactants represented by the following general formula (5):

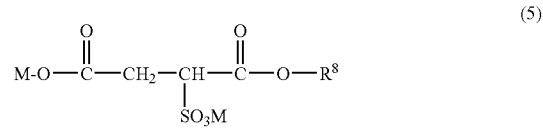

(5)

or general formula (6):

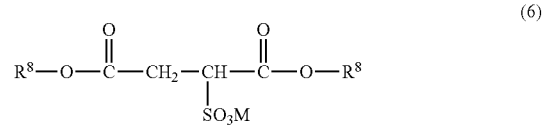

(6)

wherein M independently represents an alkali metal or ammonium group, $R^8$ independently represents hydrogen atom or an alkyl group containing 1 to 20 carbon atoms The polyoxyalkylene ether of the component (B-2) blended with the acetylene glycol or its adduct of the component (B-1) may be the polyoxyalkylene alkyl ether represented by the general formula (4), and examples include:

$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4)_w(C_3H_6O)_x(C_2H_4O)_y(C_3H_6O)_zH$ (wherein w+y=15, x+z=4), $C_{13}H_{27}O(C_2H_4O)_w(C_3H_6O)_x(C_2H_4O)_y(C_3H_6O)_zH$ (wherein w+y=15, x+z=4), $C_{12}H_{25}O(C_2H_4O)_8(C_3H_6O)_2(C_2H_4O)_6H$, $C_{13}H_{27}O(C_2H_4O)_8(C_3H_6O)_2(C_2H_4O)_6H$, $C_{13}H_{27}O(C_2H_4O)_8(C_3H_6O)_2(C_2H_4O)_6H$, $C_{12}H_{25}O(C_2H_4O)_{12}(C_3H_6O)_2(C_2H_4O)_{12}H$, $C_{13}H_{27}O(C_2H_4O)_{12}(C_3H_6O)_2(C_2H_4O)_{12}H$, $CH_3(CH_2)_9(CH_3)CHO(C_2H_4O)_7(C_3H_6O)_{4.5}H$, $CH_3(CH_2)_{11}(CH_3)CHO(C_2H_4O)_7(C_3H_6O)_{4.5}H$, $CH_3(CH_2)_9(CH_3)CHO(C_2H_4O)_5(C_3H_6O)_{3.5}H$, $CH_3(CH_2)_{11}(CH_3)CHO(C_2H_4O)_5(C_3H_6O)_{3.5}H$, $C_{14}H_{29}O(C_2H_4O)_{14}(C_3H_6O)_2H$, $C_{14}H_{29}O(C_2H_4O)_{14}(C_3H_6O)_2H$, $C_{16}H_{33}O(C_3H_6O)_4(C_2H_4O)H$, $C_{16}H_{33}O(C_3H_6O)_4(C_2H_4O)_{10}H$, $C_{16}H_{33}O(C_3H_6O)_4(C_2H_4O)_{20}H$, $C_{16}H_{33}O(C_3H_6O)_8(C_2H_4O)_{20}H$, $C_{18}H_{37}O(C_3H_6O)_{20}(C_2H_4O)_{1.5}H$, $C_{16}H_{33}O(C_3H_6O)_4(C_2H_4O)_{10}(C_3H_6O)_4(C_2H_4O)_{10}H$, and $C_{16}H_{33}O(C_3H_6O)_4(C_2H_4O)_{19}(C_3H_6O)_4H$, which may be used alone or in combination of two or more. When the component (B-2) has an HLB of less than 8, solubility in water will be insufficient, while the HLB in excess of 18 may result in an inconsistent coating.

Examples of the sulfur containing surfactants represented by the general formulae (5) and (6) include sodium n-hexylsulfosuccinate, sodium dihexylsulfosuccinate, sodiumdioctylsulfosuccinate, sodium di(2-ethylhexyl)sulfosuccinate, potassium di(2-ethylhexyl)sulfosuccinate, sodium diamylsulfosuccinate, sodium 1,3-dimethylethylsulfosuccinate, ammonium di(2-ethylhexyl)sulfosuccinate, and sodium 1,3-dimethyl butylsulfosuccinate.

The exemplary compounds of component (B-2) as described above may be used alone or in combination of two or more.

Amount of the component (B-2) used in preparing the surfactant composition of the present invention is 10 to 90% by weight, and preferably 20 to 80% by weight of the total amount of the components (B-1) and (B-2) and the component (B-3) as described below. When the content of the component (B-2) is less than 10% by weight, solubilization of the component (B-1) may be insufficient. On the other hand, content in excess of 90% by weight may result in foaming, and this may invite increase in the number of pin holes formed in the resulting coating.

In present invention, the component (B-1) and the component (B-2) are preferably used so that the total of the components (B-1) and (B-2) constitutes 100% by weight. However, the coating composition of the present invention may also include pure water or a water soluble organic solvent such as ethyleneglycol, diethylene glycol, triethylene glycol, tetraethylene glycol, polyethylene glycol, propylene glycol, dipropylene glycol, 1,3-propanediol, 1,4-butanediol, or glycerin as the component (B-3). This component (B-3) may be used to constitute 0 to 25% by weight, and preferably 5 to 20% by weight of the total amount of the components (B-1), (B-2), and (B-3) as long as such inclusion does not adversely affect the properties of the coating composition for forming the protective coating of the present invention.

As described above, the mixture of the components (B-1), (B-2), and (B-3) may be incorporated at 0.01 to 10 parts by weight, preferably at 0.1 to 5 parts by weight, and more preferably at 0.2 to 2 parts by weight in relation to 100 parts by weight of the solid content of the component (A). Incorporation of the mixture at an excessively low content may invite a coating failure, for example, by the repelling of the coating composition. On the other hand, incorporation of the mixture at an excessive amount may also invite coating failure due to increase in the bubbling.

The filler which is component (C) in the coating composition of the present invention is preferably at least one member selected from titanium, talc, kaolin, bentonite, mica, silica, heavy calcium carbonate, clay, precipitated barium sulfate, barium carbonate, glass beads, and resin beads.

The component (C) is used at an amount of 0 to 200 parts by weight and particularly at 1 to 200 parts by weight, and preferably at 5 to 150 parts by weight, and most preferably at 10 to 100 parts by weight in relation to 100 parts by weight of the solid content of the component (A). When the amount of component (C) is excessively low, the time required for drying of the coating will be unduly long, while an excessively high content of the component (C) may results in poor elongation rate of the coating, and the resulting coating may have a reduced strength.

The coating composition of the present invention for producing the protective coating of the present invention is produced by mixing the components as described above, for example, by a mixing method known in the art using a propeller blender. If desired, the component which is solid at room temperature may be added after heating.

The coating composition may also have additives such as humectant, dispersant, antifoaming agent, film forming aid, antifreeze agent, leveling agent, surfactant, light stabilizer, and antiseptic at an amount that does not adversely affect the performance of the composition.

The resulting composition is used for treating glass fibers or glass fiber products. Examples of the glass fiber products include robings and yarns. More specifically, robing cloths, chopped strand mats and glass cloths are exemplified. The glass fiber products can be obtained from alkali fiber glasses, non-alkali fiber glasses, low dielectric fiber glassed, high elastic fiber glasses and E fiber glasses.

According to the present invention, glass fibers or glass fiber products are treated with the coating composition. More specifically, filaments obtained by drawing and stretching glass fibers from a bushing having several hundred or several ten hundred nozzles are treated with the coating composition. The thus treated filaments are gathered and wound up. After heat treatment is conducted, if required, at room temperature to 400° C., especially 100 to 350° C., yarns or robings thus obtained are processed to robing cloths, glass cloths, chopped strand mats and the like. Fabric fibers can also be treated with the coating composition. In this case, points of intersection of the fabrics are especially treated. The application method of the coating composition is not limited although immersion method, spray coating method, brushing method and curtain coating method may be employed. The coating composition may be diluted with water or an organic solvent to control the concentration of the composition.

When mats such as chopped strand mats are formed, a silane coupling agent may be added to the coating composition in an amount of 0 to 5%, especially 0.01 to 1% by weight in the coating composition. Examples of the silane coupling agents include vinyltrichlorosilane, vinyltri-2-methoxyethoxysilane, vinyltriethoxysilane, 3-aminopropyltrimethoxysilane, 3-aminopropyltriethoxysilane, 3-methacryloxypropyltriethoxysilane, 3-methacryloropylmethyldimethoxysilane, 3-methacryloxypropyltrimethoxysilane, 3-mercaptopropyltrimethoxysilane, 3-glycidoxypropyltriethoxysilane, N-2-(aminoethyl)-3-aminopropyltriethoxysilane, although the silane coupling agent is not limited to the above examples.

The chopped strands are dropped and built up on a moving conveyor to form a mat. Then a binder such as a synthetic resin emulsion (e.g., PVA, acrylic resin, cellulose resin, vinyl acetate copolymer and urethane resin) is applied thereto. Thereafter, the applied mat is dried to obtain a glass fiber mat. The drying with heating is preferably conducted at a temperature of 105 to 160° C.

EXAMPLES

Next, the present invention is described in further detail by referring to the Examples and Comparative Examples which by no means limit the scope of the present invention. The parts and t in the Examples indicate parts by weight and % by weight, respectively.

Examples and Comparative Examples

Amount of the components (B-1), (B-2), and (B-3) blended are shown in Table 1.
<Mix of (B-1) and (B-2)>

[Preparation of the Coating Composition for the Protective Coating]

15 parts of Vinyblan 2583 (product name of an acryl emulsion manufactured by Nissin Chemical Industry Co., Ltd., solid content, 45%), 84 parts of ion exchanged water, 0.1 part of 3-methacryloxypropyltriethoxysilane, and 1 part of the mix (M-1 to M-15) were mixed to produce the protective coating for evaluation.

Glass fibers (E glass) having a diameter of 7 μm were drawn and stretched from a bushing having many nozzles. Four hundred of the glass fibers were treated with the above coating composition by spray coating so that 2.8% by weight (a thickness of 0.05 μm) of the coating composition in terms of solid content was applied. After heat treatment at 350° C. for 1 hour, the fibers were cut to 6 mm chopped strands. 50 g of the chopped strands were charged in a 500 ml glass graduated cylinder to which an apparatus allowing the cylinder to move up and down was mounted. The cylinder was allowed to move up and down fifty times in order to evaluate a gathering property of the chopped strand by bulkiness (mm). A low bulkiness shows a good gathering property.

TABLE 1

| Amount (% by weight) | Example | | | | | | | | Comparative Example | | | | | | |
|---|---|---|---|---|---|---|---|---|---|---|---|---|---|---|---|
| | M-1 | M-2 | M-3 | M-4 | M-5 | M-6 | M-7 | M-8 | M-9 | M-10 | M-11 | M-12 | M-13 | M-14 | M-15 |
| Component (B-1) | | | | | | | | | | | | | | | |
| Na content (ppm) | 500 | 700 | 500 | 700 | 500 | 1,200 | 500 | 700 | 500 | 500 | 500 | 700 | 500 | 500 | 500 |
| B-1-1 | 40 | | | | 55 | | 40 | | 40 | 60 | 5 | | | 60 | 5 |
| B-1-2 | | 30 | | | | | | | | | | 95 | | | |
| B-1-3 | | | 20 | | | | | | | | | | | | |
| B-1-4 | | | | 40 | | | | 30 | | | | | | | |
| B-1-4' | | | | | | 40 | | | | | | | | | |
| B-1-5 | | | | | | | | | | | | | 40 | | |
| Component (B-2) | | | | | | | | | | | | | | | |
| B-2-1 | 40 | | 80 | | | | | | | | | | 40 | | |
| B-2-2 | | 50 | | 60 | | 60 | | | | | 95 | 5 | | | |
| B-2-3 | | | | | | | | | 60 | | | | | | |
| B-2-4 | | | | | | | | | | 40 | | | | | |
| B-2-5 | | | | | 45 | | | | | | | | | | |
| B-2-6 | | | | | | | | | | | | | | 40 | |
| B-2-7 | | | | | | | 40 | | | | | | | | 95 |
| B-2-8 | | | | | | | | 70 | | | | | | | |
| Component (B-3) | | | | | | | | | | | | | | | |
| EG | 20 | | | | | | | | | | | | | | |
| PG | | 20 | | | | | | | | | | | | | |
| Pure water | | | | | | | | | | | | 20 | | | |

Component (B-1)
B-1-1: 2,4,7,9-tetramethyl-5-decyne-4,7-diol,
B-1-2: alkylene oxide adduct of 2,4,7,9-tetramethyl-5-decyne-4,7-diol (molar number of the ethylene oxide added: 20, molar number of the propylene oxide added: 10, w1 = 3 moles, w2 = 3 moles, x1 = 1 mole, x2 = 1 mole, y1 = 7 moles, y2 = 7 moles, z1 = 4 moles, z2 = 4 moles),
B-1-3: alkylene oxide adduct of 2,4,7,9-tetramethyl-5-decyne-4,7-diol (molar number of the ethylene oxide added: 15, molar number of the propylene oxide added: 15, m = 13 moles, n = 17 moles),
B-1-4: alkylene oxide adduct of 2,5-dimethyl-3-hexyne-2,5-diol (molar number of the ethylene oxide added: 42, molar number of the propylene oxide added: 42, m = 42 moles, n = 42 moles),
B-1-4': A comound having a composition the same as that of B-1-4, B-1-5: alkylene oxide adduct of 2,5,8,11-tetramethyl-6-dodecyne-5,8-diol (molar number of the ethylene oxide added: 60, molar number of the propylene oxide added: 60, m = 60 moles, n = 60 moles).
Component (B-2)
B-2-1: Noigen ET-116B (product name; manufactured by Dai-Ichi Kogyo Seiyaku Co., Ltd.; $R^7O(C_2H_4O)_w(C_3H_6O)_xH$ wherein $R^7$ is an alkyl containing 12 or 14 carbon atoms, w is 7, and x is 4.5; HLB, 12.0),
B-2-2: Noigen DL-0415 (product name; manufactured by Dai-Ichi Kogyo Seiyaku Co., Ltd.; $R^7O(C_2H_4O)_w(C_3H_6O)_x(C_2H_4O)_y(C_3H_6O)_zH$, wherein $R^7$ is an alkyl containing 12 or 13 carbon atoms, w + y is 15, and x + z is 4; HLB, 15.0),
B-2-3: Noigen YX-400 (product name; manufactured by Dai-Ichi Kogyo Seiyaku Co., Ltd.; $R^7O(C_2H_4O)_wH$, wherein $R^7$ is an alkyl containing 12 carbon atoms, and w is 40; HLB, 18.1),
B-2-4: Noigen DH-0300 (product name; manufactured by Dai-Ichi Kogyo Seiyaku Co., Ltd.; $R^7O(C_2H_4O)_wH$, wherein $R^7$ is an alkyl containing 14 carbon atoms, and w is 2; HLB, 4.0),
B-2-5: Nikkol PBC-33 (product name; manufactured by Nikko Chemicals; $CH_3(CH_2)_{14}CH_2O(C_3H_6O)_4(C_2H_4O)_{10}H$; HLB, 10.5),
B-2-6: Nikkol PEN4630 (product name; manufactured by Nikko Chemicals, $C_{24}H_{49}(C_3H_6O)_6(C_2H_4O)_{30}H$; HLB, 12.0),
B-2-7: sodium di(2-ethylhexyl)sulfosuccinate,
B-2-8: potassium di(2-ethylhexyl)sulfosuccinate.
Component (B-3)
EG: ethylene glycol
PG: propylene glycol
Na was quantitatively determined by ICP emission spectrophotometer (IRIS Intorepid II XSP).

Thereafter, the chopped strands were dropped and built up on a moving conveyor to prepare a mat having a chopped strand weight of 450 g/m². Vinybran 2583 diluted so that the concentration of the solid matter was 4% by weight was applied to the mat by spray coating method. The amount of the resin applied to the mat was 4% by weight. Then the mat was dried for 10 minutes at 150° C. to obtain a glass fiber mat. The resulting mat was cut to 125 mm length×100 mm width to prepare an evaluation sample.

Using a tensile tester SHIMADZU AUTOGRAPH AG-2000E, the strength at the length direction of the evaluation sample was measured at a tensile rate of 5 mm/minute.

Results are shown in Table 2.

TABLE 2

|  | Example |  |  |  |  |  |  |  | Comparative Example |  |  |  |  |  |  |
| --- | --- | --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 | 6 | 7 |
| Blend | M-1 | M-2 | M-3 | M-4 | M-5 | M-6 | M-7 | M-8 | M-9 | M-10 | M-11 | M-12 | M-13 | M-14 | M-15 |
| Bulkiness (mm) | 90 | 90 | 95 | 90 | 90 | 100 | 90 | 90 | 170 | 160 | 180 | 170 | 180 | 170 | 180 |
| Tensile strength (kgf) | 16 | 14 | 15 | 15 | 14 | 12 | 13 | 15 | 7 | 7 | 6 | 6 | 5 | 7 | 4 |

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A glass fiber product comprising glass fibers having a protective coating thereon, the protective coating being formed from a coating composition, wherein the coating composition has a solid content and wherein the only (A) synthetic resin in the solid content is formed from at least one selected from the group consisting of (meth)acrylate resin emulsion, styrene-acrylate copolymer emulsion, vinyl acetate resin emulsion, and vinyl acetate-(meth)acrylate copolymer emulsion; and wherein said (A) synthetic resin is the main component in the coating composition; said coating composition comprising:

100 parts of said (A) synthetic resin, and (B) 0.01 to 10 parts by weight of a mixture of (B-1) 10 to 90% by weight of at least one member selected from an acetylene glycol represented by the following general formula (1):

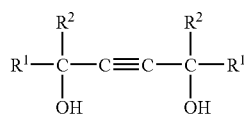
(1)

wherein $R^1$ and $R^2$ are respectively an alkyl group containing 1 to 5 carbon atoms, an ethylene oxide-propylene oxide block adduct of an acetylene glycol represented by the following general formula (2):

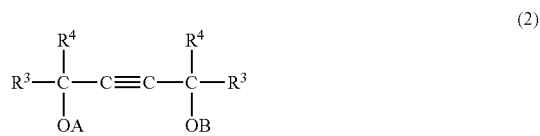
(2)

wherein $R^3$ and $R^4$ are respectively an alkyl group containing 1 to 5 carbon atoms; A is $—(C_2H_4O)_{w1}—(C_3H_6O)_{x1}—(C_2H_4O)_{y1}—(C_3H_6O)_{z1}—H$; and B is $—(C_2H_4O)_{w2}—(C_3H_6O)_{x2}—(C_2H_4O)_{y2}—(C_3H_6O)_{z2}—H$; wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100); and an ethylene oxide-propylene oxide random adduct of an acetylene glycol represented by the following general formula (3):

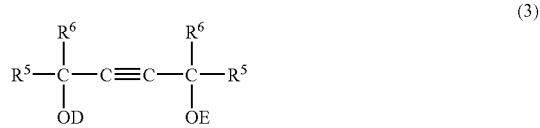
(3)

wherein $R^5$ and $R^6$ are respectively an alkyl group containing 1 to 5 carbon atoms; D is $—(C_2H_4O/C_3H_6O)_m—H$; and E is $—(C_2H_4O/C_3H_6O)_n—H$; wherein m and n are respectively 0 or a positive number of 0.5 to 50, and m+n is 1 to 100);

(B-2) 10 to 90% by weight of at least one member selected from a polyoxyalkylene alkyl ether having an HLB of 8 to 18 represented by the following general formula (4):

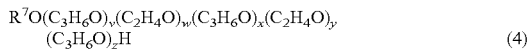

$R^7O(C_3H_6O)_v(C_2H_4O)_w(C_3H_6O)_x(C_2H_4O)_y(C_3H_6O)_zH$ (4)

wherein $R^7$ is an alkyl group containing 1 to 20 carbon atoms; v, w, x, y, and z are respectively 0 or a positive number of 1 to 20; with the proviso v+w+x+y+z>0; and (B-3) 0 to 25% by weight of water and/or a water soluble organic solvent.

2. The glass fiber product according to claim 1, wherein the component (B-1) has a sodium content of from 100 to 800 ppm.

3. The glass fiber product according to claim 1, wherein the protective coating layer has a thickness of 0.001 to 5 μm.

4. The glass fiber product according to claim 1, wherein the acetylene glycols represented by the general formula (1) is selected from the group consisting of 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4, 7-diol, 2,3,6,7-tetramethyl-4-octyne-3,6-diol, 3,6-dimethyl-4-octyne-3,6-diol, and 2,5-dimethyl-3-hexyne-2,5-diol.

5. The glass fiber product according to claim 1, wherein the ethylene oxide-propylene oxide block adduct of the acetylene glycol represented by the general formula (2) is selected from the group consisting of:

alkylene oxide adduct of 2,5,6,11-tetramethyl-6-dodecyne-5,8-diol (molar number of the ethylene oxide added: 10, molar number of the propylene oxide added: 40, $w1=2$ moles, $w2=2$ moles, $x1=8$ moles, $x2=8$ moles, $y1=3$ moles, $y2=3$ moles, $z1=12$ moles, $z2=12$ moles), alkylene oxide adduct of 2,5,8,11-tetramethyl-6-dodecyne-5,8-diol (molar number of the ethylene oxide added: 40, molar number of the propylene oxide added: 10, $w1=20$ moles, $w2=20$ moles, $x1=5$ moles, $x2=5$ moles, $y1$, $y2$, $z1$, $z2=0$ mole), alkylene oxide adduct of 5,8-dimethyl-6-dodecyne-5,8-diol (molar number of the ethylene oxide added: 20, molar number of the propylene oxide added: 20, $w1=7$ moles, $w2=7$ moles, $x1=10$ moles, $x2=10$ moles, $y1=3$ moles, $y2=3$ moles, $z1$, $z2=0$ mole), alkylene oxide adduct of 5,8-dimethyl-6-dodecyne-5,8-diol (molar number of the ethylene oxide added: 20, molar number of the propylene oxide added: 20, $w1$, $w2=0$ mole, $x1=10$ moles, $x2=10$ moles, $y1=10$ moles, $y2=10$ moles, $z1$, $z2=0$ mole), alkylene oxide adduct of 2,4,7,9-tetramethyl-5-decyne-4,7-diol (molar number of the ethylene oxide added: 20, molar number of the propylene oxide added: 10, $w1=3$ moles, $w2=3$ moles, $x1=1$ mole, $x2=1$ mole, $y1=7$ moles, $y2=7$ moles, $z1=4$ moles, $z2=4$ moles), alkylene oxide adduct of 2,4,7,9-tetramethyl-5-decyne-4,7-diol (molar number of the ethylene oxide added: 20, molar number of the propylene oxide added: 10, $w1=10$ moles, $w2=10$ moles, $x1=5$ moles, $x2=5$ moles, $y1$, $y2$, $z1$, $z2=0$ mole), alkylene oxide adduct of 4,7-dimethyl-5-decyne-4,7-diol (molar number of the ethylene oxide added: 30, molar number of the propylene oxide added: 6, $w1=7$ moles, $w2=7$ moles, $x1=3$ moles, $x2=3$ moles, $y1=8$ moles, $y2=8$ moles, $z1$, $z2=0$ mole), alkylene oxide adduct of 4,7-dimethyl-5-decyne-4,7-diol (molar number of the ethylene oxide added: 30, molar number of the propylene oxide added: 6, $w1$, $w2=0$ mole, $x1=1$ mole, $x2=1$ mole, $y1=15$ moles, $y2=15$ moles, $z1=2$ moles, $z2=2$ moles), alkylene oxide adduct of 2,3,6,7-tetramethyl-4-octyne-3,6-diol (molar number of the ethylene oxide added: 8, molar number of the propylene oxide added: 4, $w1=2$ moles, $w2=2$ moles, $x1=1$ mole, $x2=1$ mole, $y1=2$ moles, $y2=2$ moles, $z1=1$ mole, $z2=1$ mole), alkylene oxide adduct of 3,6-diethyl-4-octyne-3,6-diol (molar number of the ethylene oxide added: 24, molar number of the propylene oxide added: 18, $w1=5$ moles, $w2=5$ moles, $x1=9$ moles, $x2=9$ moles, $y1=7$ moles, $y2=7$ moles, $z1$, $z2=0$ mole), alkylene oxide adduct of 3,6-dimethyl-4-octyne-3,6-diol (molar number of the ethylene oxide added: 36, molar number of the propylene oxide added: 26, $w1=10$ moles, $w2=10$ moles, $x1=5$ moles, $x2=5$ moles, $y1=8$ moles, $y2=8$ moles, $z1=8$ moles, $z2=8$ moles), and alkylene oxide adduct of 2,5-dimethyl-3-hexyne-2,5-diol (molar number of the ethylene oxide added: 44, molar number of the propylene oxide added: 40, $w1=8$ moles, $w2=8$ moles, $x1=4$ moles, $x2=4$ moles, $y1=14$ moles, $y2=14$ moles, $z1=16$ moles, $z2=16$ moles).

6. The glass fiber product according to claim 1, wherein the ethylene oxide-propylene oxide random adduct of the acetylene glycol represented by the general formula (3) is selected from the group consisting of:

alkylene oxide adduct of 2,5,8,11-tetramethyl-6-dodecyne-5,8-diol (molar number of the ethylene oxide added: 20, molar number of the propylene oxide added: 20, $m=20$ moles, $n=20$ moles), alkylene oxide adduct of 5,8-dimethyl-6-dodecyne-5,8-diol (molar number of the ethylene oxide added: 10, molar number of the propylene oxide added: 10, $m=12$ moles, $n=8$ moles), alkylene oxide adduct of 2,4,7,9-tetramethyl-5-decyne-4,7-diol (molar number of the ethylene oxide added: 15, molar number of the propylene oxide added: 15, $m=13$ moles, $n=17$ moles), alkylene oxide adduct of 4,7-dimethyl-5-decyne-4,7-diol (molar number of the ethylene oxide added: 27, molar number of the propylene oxide added: 27, $m=27$ moles, $n=27$ moles), alkylene oxide adduct of 2,3,6,7-tetramethyl-4-octyne-3,6-diol (molar number of the ethylene oxide added: 2.5, molar number of the propylene oxide added: 2.5, $m=2.5$ moles, $n=2.5$ moles), alkylene oxide adduct of 3,6-diethyl-4-octyne-3,6-diol (molar number of the ethylene oxide added: 21, molar number of the propylene oxide added: 21, $m=20$ moles, $n=22$ moles), alkylene oxide adduct of 3,6-dimethyl-4-octyne-3,6-diol (molar number of the ethylene oxide added: 31, molar number of the propylene oxide added: 31, $m=27$ moles, $n=35$ moles), and alkylene oxide adduct of 2,5-dimethyl-3-hexyne-2,5-diol (molar number of the ethylene oxide added: 42, molar number of the propylene oxide added: 42, $m=42$ moles, $n=42$ moles).

7. The glass fiber product according to claim 1, wherein a total molar number of the alkylene oxide added in the general formulae (2) and (3) is 1 to 100 moles.

8. The glass fiber product according to claim 1, wherein a total molar number of the ethylene oxide added in the general formulae (2) and (3) is 0.5 to 50 moles.

9. The glass fiber product according to claim 1, wherein the polyoxyalkylene alkyl ether having an HLB (Hydrophilic-Lipophilic Balance) of 8 to 18 represented by the formula (4) is at least one selected from the group consisting of:

$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)_w(C_3H_6O)_x(C_2H_4O)_y(C_3H_6O)_zH$ (wherein $w+y=15$, $x+z=4$),
$C_{13}H_{27}O(C_2H_4O)_w(C_3H_6O)_x(C_2H_4O)_y(C_3H_6O)_zH$ (wherein $w+y=15$, $x+z=4$),
$C_{12}H_{25}O(C_2H_4O)_8(C_3H_6O)_2(C_2H_4O)_6H$, $C_{13}H_{27}O(C_2H_4O)_8(C_3H_6O)_2(C_2H_4O)_6H$,
$C_{13}H_{27}O(C_2H_4O)_8(C_3H_6O)_2(C_2H_4O)_6H$, $C_{12}H_{25}O(C_2H_4O)_{12}(C_3H_6O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_6O)_{4.5}H$,
$CH_3(CH_2)_9(CH_3)CHO(C_2H_4O)_5(C_3H_6O)_{3.5}H$,
$CH_3(CH_2)_{11}(CH_3)CHO(C_2H_4O)_5(C_3H_6O)_{3.5}H$, $C_{14}H_{29}O(C_2H_4O)_{14}(C_3H_6O)_2H$,
$C_{14}H_{29}O(C_2H_4O)_{14}(C_3H_6O)_2H$, $C_6H_{33}O(C_3H_6O)_4(C_2H_4O)H$,
$C_{16}H_{33}O(C_3H_6O)_4(C_2H_4O)_{10}H$, $C_{16}H_{33}O(C_3H_6O)_4(C_2H_4O)_{20}H$, $C_{16}H_{33}O(C_3H_6O)_8(C_2H_4O)_{20}H$, $C_{18}H_{37}O(C_3H_6O)_{20}(C_2H_4O)_{1.5}H$, $C_{16}H_{33}O(C_3H_6O)_4(C_2H_4O)_{10}(C_3H_6O)_4(C_2H_4O)_{10}H$, and $C_6H_{33}O(C_3H_6O)_4(C_2H_4O)_{19}(C_3H_6O)_4H$.

10. The glass fiber product according to claim 1, wherein the coating composition further comprises at least one filler as a component (C).

11. The glass fiber product according to claim 10, wherein the at least one filler of component (C) is selected from the group consisting of titanium, talc, kaolin, bentonite, mica, silica, heavy calcium carbonate, clay, precipitated barium sulfate, barium carbonate, glass beads, and resin beads.

12. The glass fiber product according to claim 10, wherein the at least one of component (C) is used at an amount of 1 to 200 parts by weight in relation to 100 parts by weight of the solid content of the component (A).

13. The glass fiber product according to claim 1, wherein the coating composition further comprises at least one additive selected from the group consisting of humectant, dispersant, antifoaming agent, film forming aid, antifreeze agent, leveling agent, surfactant, stabilizer and antiseptic.

* * * * *